United States Patent
Goss et al.

(10) Patent No.: US 9,511,533 B2
(45) Date of Patent: Dec. 6, 2016

(54) METHOD AND APPARATUS FOR FORMING STRETCH BLOW MOLDED CONTAINERS

(75) Inventors: Kent Goss, Louisburg, KS (US); Paul Kelley, Wrightsville, PA (US); Scott Bysick, Lancaster, PA (US); Philip Sheets, York, PA (US)

(73) Assignee: GRAHAM PACKAGING COMPANY, L.P., York, PA (US)

( * ) Notice: Subject to any disclaimer, the term of this patent is extended or adjusted under 35 U.S.C. 154(b) by 1260 days.

(21) Appl. No.: 12/866,810

(22) PCT Filed: Jan. 11, 2007

(86) PCT No.: PCT/US2007/000800
§ 371 (c)(1),
(2), (4) Date: Aug. 9, 2010

(87) PCT Pub. No.: WO2007/082051
PCT Pub. Date: Jul. 19, 2007

(65) Prior Publication Data
US 2011/0018177 A1     Jan. 27, 2011

Related U.S. Application Data

(60) Provisional application No. 60/757,889, filed on Jan. 11, 2006.

(51) Int. Cl.
*B29C 49/54*     (2006.01)
*B29C 33/42*     (2006.01)
(Continued)

(52) U.S. Cl.
CPC ............. *B29C 49/541* (2013.01); *B29C 33/42* (2013.01); *B29C 49/4802* (2013.01); *B29C 49/06* (2013.01); *B29C 49/10* (2013.01); *B29C 49/36* (2013.01); *B29C 49/70* (2013.01); *B29C 2049/1271* (2013.01); *B29C 2049/4892* (2013.01); *B29C 2049/546* (2013.01); *B29L 2031/7158* (2013.01)

(58) Field of Classification Search
CPC .................................................. B29C 49/541
USPC .......................................................... 264/531
See application file for complete search history.

(56) References Cited

U.S. PATENT DOCUMENTS 3,601,858 A     8/1971   Blanchard
3,819,789 A *   6/1974   Parker ........................... 264/534
(Continued)

FOREIGN PATENT DOCUMENTS

EP     0 346 518     12/1989
EP     0655313 A1    5/1995
(Continued)

OTHER PUBLICATIONS

PCT International Search Report and Written Opinion.
U.S. Appl. No. 60/671,459, Paul Kelley, filed Apr. 15, 2005.

*Primary Examiner* — Larry Thrower
(74) *Attorney, Agent, or Firm* — Baker Botts L.L.P.

(57) ABSTRACT

The present invention relates to a base assembly (100) for forming a base portion of a plastic container. The base assembly comprises a base pedestal (104), a base mold attached to the base pedestal, a push rod (102) movable between a first position and a second position with respect to the base mold to reposition a portion of the plastic container, and an activation mechanism adapted to move the push rod between the first position and the second position.

8 Claims, 9 Drawing Sheets

(51) Int. Cl.
*B29C 49/48* (2006.01)
*B29C 49/06* (2006.01)
*B29C 49/10* (2006.01)
*B29C 49/36* (2006.01)
*B29C 49/70* (2006.01)
*B29C 49/12* (2006.01)
*B29L 31/00* (2006.01)

(56) References Cited

U.S. PATENT DOCUMENTS

| | | |
|---|---|---|
| 3,856,450 A | 12/1974 | Britten |
| 2002/0027308 A1 | 3/2002 | Koppenhofer |

FOREIGN PATENT DOCUMENTS

| | | |
|---|---|---|
| EP | 1163996 A2 | 12/2001 |
| JP | 1133714 A | 5/1989 |
| JP | 04358819 | 12/1992 |
| JP | 5254531 A | 10/1993 |
| WO | 2006113428 A2 | 10/2006 |

\* cited by examiner

METHOD AND APPARATUS FOR FORMING STRETCH BLOW MOLDED CONTAINERS

BACKGROUND OF THE INVENTION

1. Field of the Invention

The present invention relates generally to a method and apparatus for forming blow molded plastic containers. More particularly, the present invention relates to a method and apparatus that utilizes a movable, in-mold structure for displacing a portion of the blow molded container, such as the base.

2. Related Art

Conventionally, a container may be manufactured through a process known as blow molding. In blow molding, a parison is received at a blow molding apparatus, and the parison is enclosed by a container mold. The blow molding apparatus inflates the parison by forcing gas into the parison which causes the parison to stretch and take the shape of the container mold. Once the parison has taken the shape of the container mold, the blow molding step is complete and the container is removed from the container mold for further processing.

In some applications of container manufacturing, a deep protrusion may be required at a particular section of a container, for example, at a base or at a hand grip of the container. Deep protrusions, when located at the base of the container, are sometimes referred to as "push-ups" since the protrusions push up into the interior of the container. Employing known techniques to manufacture containers with deep protrusions has various problems. One such problem is the lack of orientation of the plastic material around the deep protrusion, as discussed in more detail in co-pending U.S. Patent Application No. 60/671,459, the entire content of which is incorporated herein by reference.

There remains a need in the art, however, for an apparatus and method for forming blow molded plastic containers that include a deep protrusion or other structure extending into the interior of the container.

BRIEF SUMMARY OF THE INVENTION

According to one exemplary embodiment, the present invention relates to a base assembly for forming a base portion of a plastic container. The base assembly comprises a base pedestal, a base mold attached to the base pedestal, a push rod movable between a first position and a second position with respect to the base mold to reposition a portion of the plastic container, and an activation mechanism adapted to move the push rod between the first position and the second position.

According to another exemplary embodiment, the present invention relates to a blow mold for a plastic container. The blow mold can comprise a plurality of mold portions together defining a cavity for a blow molded plastic container, a push rod extending through at least one of the mold portions and movable between a first position and a second position with respect to the at least one mold portion to reposition a portion of the plastic container; and an activation mechanism adapted to move the push rod between the first position and the second position.

The present invention also relates to a method of blow molding a plastic container. The method comprises (a) enclosing a parison within a mold cavity of a blow mold, (b) inflating the parison within the mold cavity to form a blow molded container having a movable region, and (c) moving a portion of the blow mold to reposition the movable region while the blow molded container is in the mold cavity.

Further objectives and advantages, as well as the structure and function of preferred embodiments, will become apparent from a consideration of the description, drawings, and examples.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

When forming a plastic container, it may be desirable to mold a movable region of the container in an outwardly extending position, and subsequently displace or invert the movable region into the interior of the container. This may be desirable, for example, to improve material flow or physical properties of the container. The present invention relates to a method and apparatus for displacing or inverting such a movable region of a plastic container.

Figure 1A:
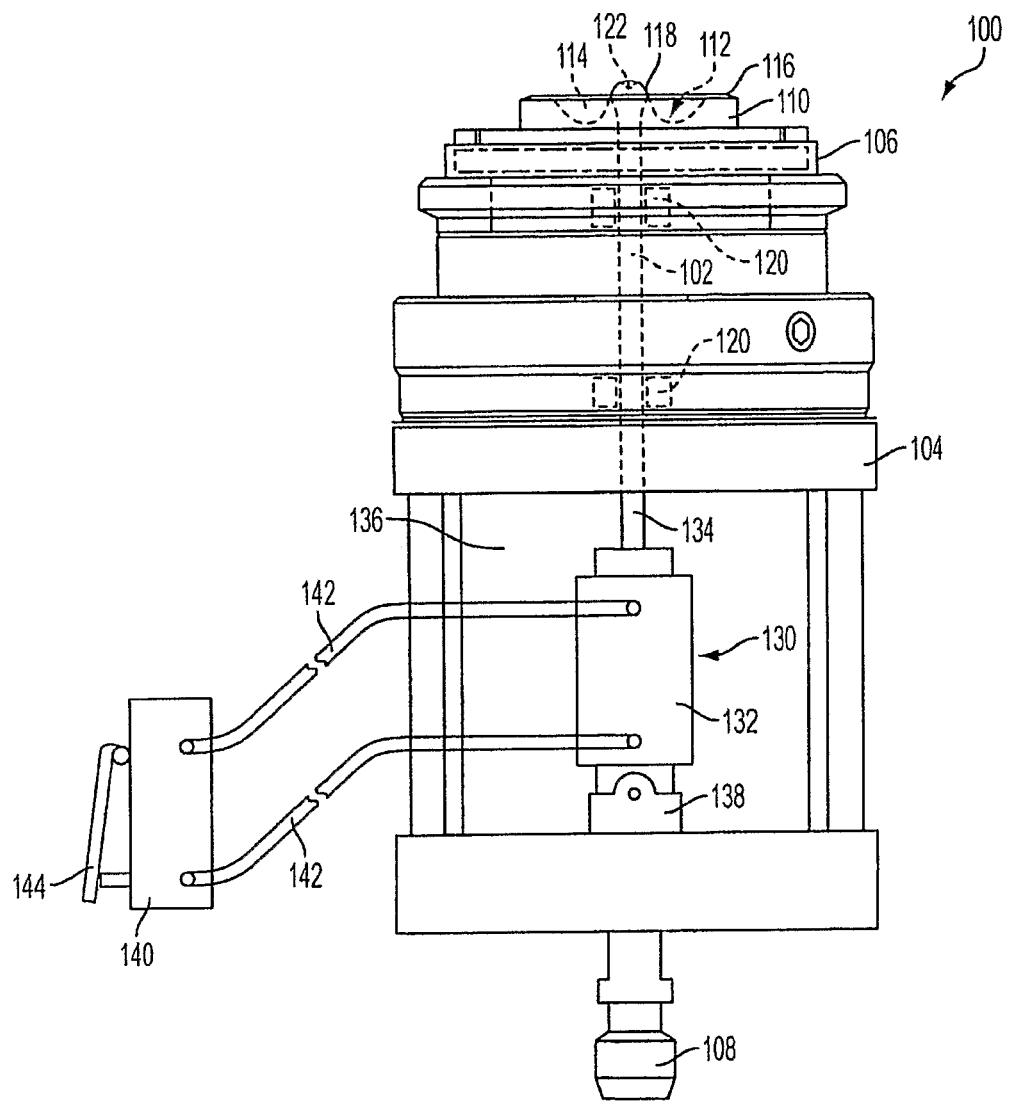
FIGS. 1A-B are side views of a base assembly of a blow mold according to an exemplary embodiment of the present invention.
Figure 1B:
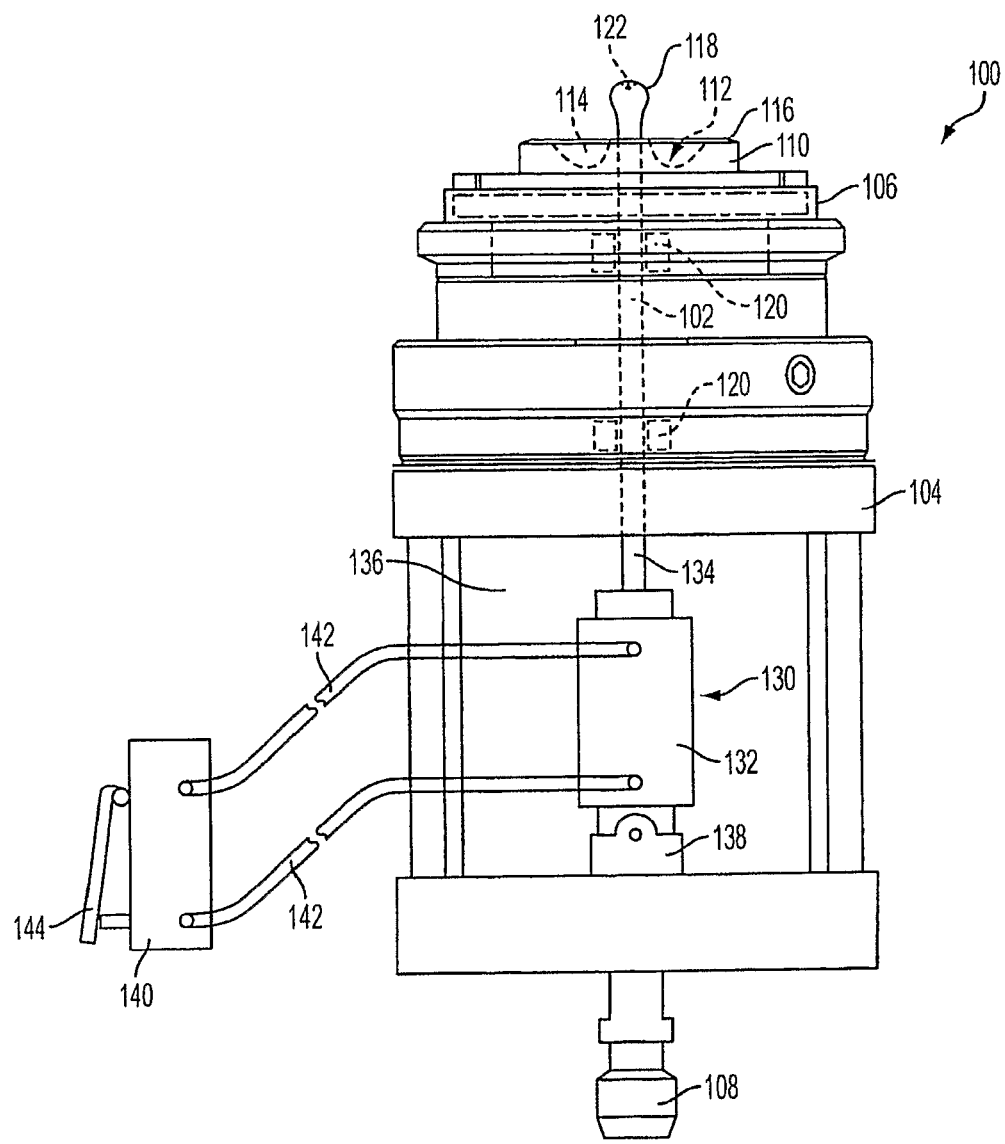

FIGS. 1A-B illustrate an exemplary embodiment of a base assembly 100 of a blow mold, according to the present invention. FIG. 1A illustrates a side view of the base assembly 100 having a push rod 102 in a first, or retracted position, while FIG. 1B illustrates a side view of the base assembly 200 with the push rod 102 in a second, or extended position. As will be described in more detail below, once the container is formed in the blow mold, a moveable region of the container (e.g., the base) can be repositioned from an outwardly protruding position to an inwardly protruding position (e.g., toward the interior of the container).

The base assembly 100 can include a base pedestal 104, a base plug 106, a centering pin 108, and push rod 102. The centering pin 108 can be used to secure and position the base assembly 100 in a blow molding apparatus (not shown in FIGS. 1A-B). The base pedestal 104 can have any shape, so long as it is adapted to accommodate the push rod 102, and to connect with the base plug 106. For example, as shown in FIGS. 1A-B, the base pedestal 104 can have a hollow central region dimensioned to accommodate the push rod 102 and at least a portion of the associated activation mechanism (described below). In addition, the base pedestal 104 can have an upper region adapted to connect with the base plug 106. According to an alternative embodiment, the base plug 106 and the base pedestal 104 can be a single apparatus. During blow molding, the base assembly 100 can be raised to connect with other mold assemblies for blow molding a container, as described in more detail below. After the container is blow molded, the base assembly 100 can be lowered to release the container.

The base plug 106 can include a base mold 110 defining a contact surface 112 adapted to contact a parison material during blow molding of a container. According to one exemplary embodiment, the contact surface 112 can include a cavity 114, an outer surface 116, and an end surface 118 of the push rod 102. The contact surface 112 of the base mold 110 can form the shape of at least part of the container base during blow molding. In the exemplary embodiment shown, the contact surface 112 is shaped and configured to form a moveable region and a bearing surface of a container base, however other configurations are possible. Further details on the base mold 110 and contact surface 112 are provided in co-pending U.S. Patent Application No. 60/671,459, the entire content of which is incorporated herein by reference.

The push rod 102 can comprise a cylindrically shaped rod that extends through the base pedestal 104 and is movable with respect to the base mold 110. According to one exemplary embodiment, the push rod 102 can be a metal mold component. The base assembly 100 can include a bore having one or more bushings 120, for example, ceramic bushings, that support the push rod 102 for sliding movement with respect to the base mold 110. Alternatively, the base assembly 100 can include linear bearings or other structures known in the art to support the push rod 102 for movement with respect to the base mold 110.

As described above, the end surface 118 of the push rod 102 can define a portion of the contact surface 112 of the base mold 110 when the push rod 102 is in the first position (FIG. 1A). In the exemplary embodiment shown, the end surface 118 is adapted to form a dimple in the base of the container. According to this embodiment, the shape of the end surface 118 is similar to a truncated cone, with the end of the truncated cone including a portion 122 (shown in phantom lines in FIGS. 1A-B). The section 122 may be concave, for example, to form a convex section in the base of the container that extends downward away from the center of the container. Alternatively, the section 122 of the end surface 118 may be flat or convex extending upward toward the center of the container. The push rod 102 can be used to reposition a moveable region of the base from an initially outward protruding position to a position within the container cavity, as will be discussed in more detail below.

Still referring to FIGS. 1A-B, the base assembly 100 can include an activation mechanism 130 that moves the push rod 102 between an initial, or first position, shown in FIG. 1A, and an extended, or second position, shown in FIG. 1B. For example, the activation mechanism can elevate the end surface 118 of the push rod 102 above the surface of the base mold 110, as shown in FIG. 1B. In the exemplary embodiment shown in FIGS. 1A-B, the activation mechanism 130 comprises an air cylinder 132, such as a double acting cylinder, connected to the push rod 102. The air cylinder 132 can include an output shaft 134 that is coupled to, or integral with, the push rod 102. In the embodiment where the output shaft 134 is coupled to the push rod 102, any number of connectors known in the art may be used. For example, the output shaft 134 and push rod 102 may be coupled using an internal or external threaded connection. A threaded connection can advantageously allow the combined length of the output shaft 134 and push rod 102 to be varied, consequently allowing for adjustment of the initial and extended positions of the push rod 102. Alternatively, the output shaft 134 may be welded to or bonded to the push rod 102. Other exemplary techniques for coupling the output shaft 134 to the push rod 102 include pinning and press fitting.

According to the exemplary embodiment shown in FIGS. 1A-B, the air cylinder 132 can be partially or entirely located within a hollow central region 136 of the base pedestal 104, however, the air cylinder 132 can alternatively be located outside the base pedestal 104. The air cylinder 132 can be anchored to the base pedestal 104 by a base block 138, for example, a pillow block or other known structure. One or more shims (not shown) can be placed between the base block 138 and the base pedestal 104 to provide for adjustment of the initial and extended positions of the push rod 102. Additionally or alternatively, the base block 138 can itself include a mechanism for adjusting the initial and extended positions of the push rod 102. For example, the base block 138 can include overlapping ramp surfaces (not shown) and a graduated screw (not shown) that cooperate to adjust the overall height of the base block 138, although other configurations are possible. Alternative exemplary embodiments for connecting the air cylinder 132 to the base pedestal 104 include connecting the air cylinder 132 directly to the base pedestal 104 (e.g., by screwing, pinning, press fitting, bonding, or welding), or forming a portion of the air cylinder 132 integrally with a portion of the base pedestal 104.

The activation mechanism 132 can further include a pneumatic valve 140. Pneumatic valve 140 can be connected to the air cylinder 132 via one or more conduits 142. By regulating the amount of air that passes from an external pressure source (not shown) to the air cylinder 132 via one or more of the conduits 142, the pneumatic valve 140 can control the movement of the output shaft 134, and correspondingly, the movement of the push rod 102. Thus, the pneumatic valve 140 can be used to control movement of the push rod 102 between the initial and extended positions. It can also be used to control the stroke length of the push rod 102, as well as the stroke speed and other parameters of the movement of the push rod 102.

According to an exemplary embodiment of the present invention, the base assembly 100 can be incorporated into a blow molding machine having an electronic control device, such as a programmable logic controller, that controls the movement of some or all of the components of the blow molding machine. According to this embodiment, the pneumatic valve 140 can be electrically connected to the electronic control device, such that the electronic control device controls the pneumatic valve 140 and the resultant movement of the push rod 102.

Figure 2:
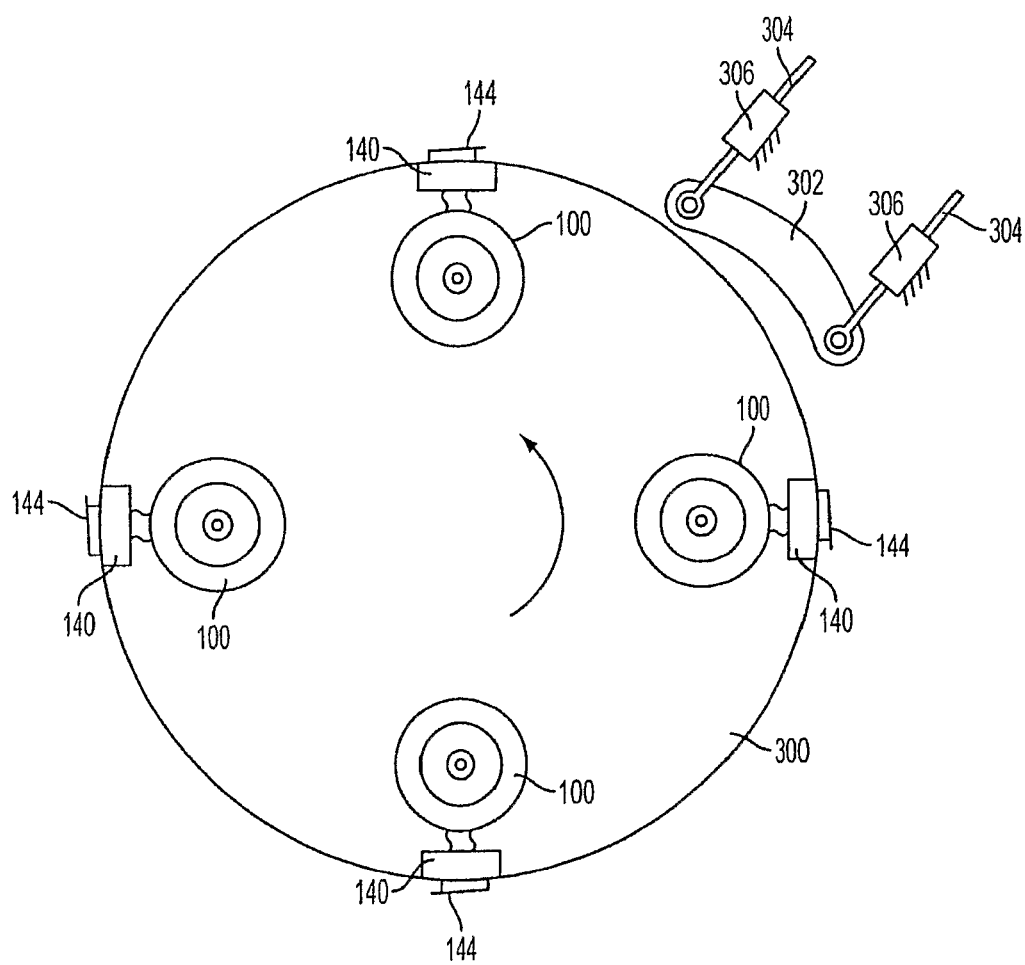
FIG. 2 depicts an exemplary blow wheel of a blow molding machine, including a plurality of the base assemblies of FIGS. 1A-B.

According to another exemplary embodiment, the pneumatic valve 140 can be controlled via mechanical means, for instance, on a blow molding machine that does not have an electronic control device, or in instances where electronic control is not preferable. Referring to FIG. 2, a plurality of the base assemblies 100 can be located on a rotating blow wheel 300 of a blow molding machine. The pneumatic valves 140 can be located around the periphery of the wheel 300. Each pneumatic valve 140 can have a switch 144 (also shown in FIGS. 1A-B) that regulates movement of air through the pneumatic valve 140 and into the air cylinder 132. One or more cam members 302 can be located on or near the blow molding machine in a stationary manner with respect to the blow wheel 300. When each respective base assembly 100 (and the attendant pneumatic valve 140 and switch 144) rotates past the cam member 302, the cam member 302 can impart movement to the switch 144 (e.g., depress the switch 144). This movement of switch 144 can, for example, cause air to flow through the pneumatic valve 140 in a manner that causes the air cylinder 132 to move the push rod 102 to the extended position. When the switch 144 moves past the cam member 302, the switch 144 can return to its original position (e.g., under the force of a spring), thereby changing or stopping the flow of air through the pneumatic valve 140, such that the push rod 102 returns to its original position.

According to an exemplary embodiment, the position of the cam member 302 with respect to the wheel 300 and/or switches 144 can be adjustable. For example, the cam member 302 can be mounted on a pair of shafts 304 that are slidable in fixed anchors 306. Set screws (not shown) or other known fasteners can be provided in the anchors 306 to lock the shafts 304 in the anchors 306, thereby fixing the position of the cam member 302. Adjustment of the position of the cam member 302 with respect to the switches 144 can advantageously provide for adjustment of the amount of depression of the switches 144, for example, to minimize wear on the switches 144 or to adjust the stroke of the air cylinders 132. Additionally or alternatively; the adjustment may allow the cam member 302 to be moved completely out of contact with the switches 144, for example, to eliminate wear on the switches 144 and/or cam member 302 during dry cycling of the machine.

Figure 3A:
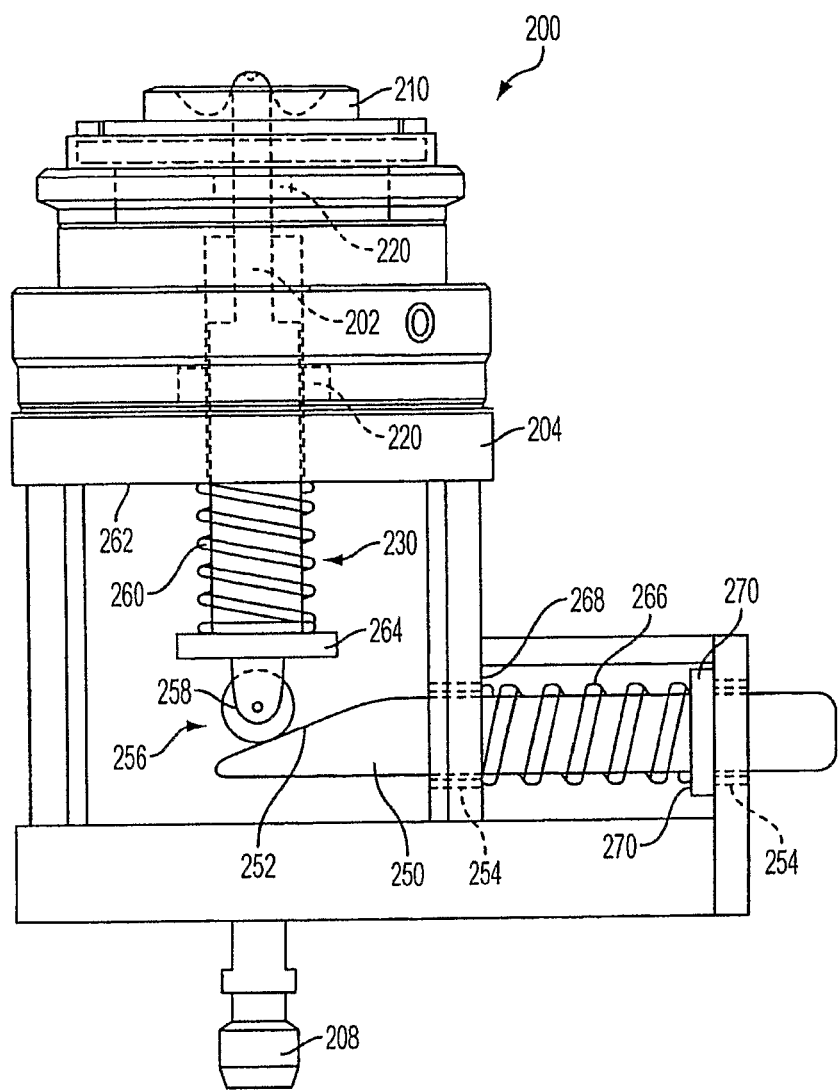
FIGS. 3A-B are side views of a base assembly of a blow mold according to another exemplary embodiment of the present invention.
Figure 3B:
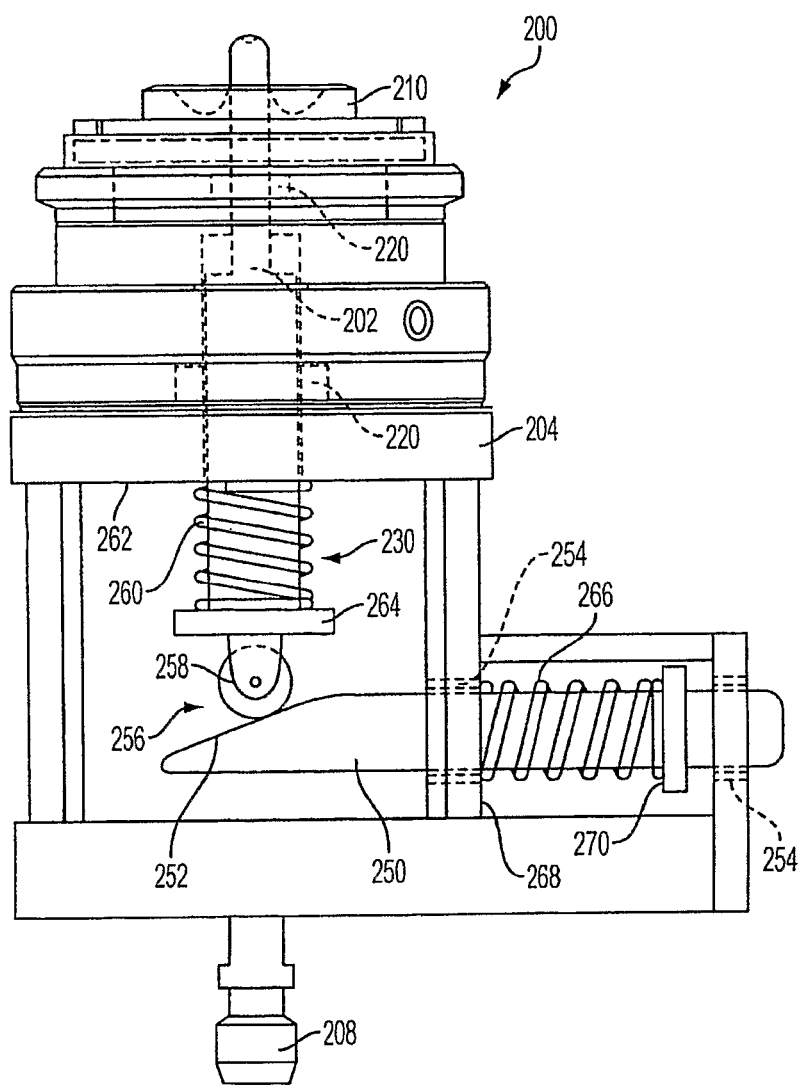

Referring to FIGS. 3A-B, another exemplary embodiment of a base assembly according to the present invention is shown. Except where indicated otherwise below, the elements of base assembly 200 are similar to or identical to the corresponding elements of base assembly 100, shown and described above with respect to FIGS. 1A-B.

The base assembly 200 of FIGS. 3A-B can include an activation mechanism 230 that utilizes one or more cam members to move the push rod 202 between the initial position (FIG. 3A) and the extended position (FIG. 3B). A first cam member 250 can be mounted in the base pedestal 204. The first cam member 250 can include a cam surface 252 (e.g., an inclined or ramped surface) that interacts with a cam follower (described below) to impart movement to the push rod 202. The base assembly 200, and particularly the base pedestal 204, can include one or more bushings 254, for example, ceramic bushings, to support the first cam member 250 for sliding movement with respect to the push rod 202. Alternatively, the base assembly 200 can include linear bearings or other structures known in the art to support the first cam member 250 for sliding movement. In the exemplary embodiment shown in FIGS. 3A-B, the push rod 202 moves along a first axis that is substantially aligned with the central axis of a container being formed, and the first cam member 250 slides along a second axis that is substantially transverse to the first axis, however, other configurations are possible.

The push rod 202 can include a cam follower 256 that interacts with the cam first cam member 250 to impart movement to the push rod 202. In its simplest form, the cam follower 256 can comprise the end of the push rod 202. According to one exemplary embodiment, the end can be rounded to allow for smooth movement along the cam surface 252. According to another exemplary embodiment, the cam follower 256 can comprise a roller 258 attached to the end of the push rod 202. In embodiments where the cam follower 256 comprises a roller 258, the push rod 202 and bearings 220 can have substantially matching cross-sections (e.g., square) that prevent the push rod 202 from rotating about its axis with respect to the base assembly 200, thereby preventing the roller 258 from becoming misaligned on the cam surface 252.

The push rod 202 can be biased toward the initial position shown in FIG. 3A. For example, a coil spring 260 can extend around the push rod 202 between a surface 262 of the base pedestal 204, and a shoulder 264 located on the push rod 202 proximate the cam follower 256, although other configurations are possible and will be apparent to those of ordinary skill in the art. The first cam member 250 can also be biased toward the position shown in FIG. 3A (corresponding to the initial position of the push rod 202). For example, a coil spring 266 can extend around the first cam member 250 between a surface 268 of the base pedestal 204, and a shoulder 270 located on the first cam member 250, however, other configurations are possible and will be apparent to those of ordinary skill in the art.

Movement of the first cam member 250 from the position shown in FIG. 3A to the position shown in FIG. 3B causes the cam follower 256 to slide along the cam surface 252, and correspondingly, move the push rod 202 from the initial, or first position, to the extended, or second, position. Returning the first cam member 250 to the position shown in FIG. 3A causes the push rod 202 to return to its initial position shown in FIG. 3l, for example, under the force of spring 260, if provided.

The embodiment of FIGS. 3A-B has many components that are similar to, or identical to, the embodiment of FIGS. 1A-B. One of ordinary skill in the art will know and appreciate that many of the components can be interchanged between these exemplary embodiments with little or no modification. For example, the push rod 102 of FIGS. 1A-B can be replaced with for the push rod 202 of FIGS. 3A-B by changing the dimensions of the bushings 120 and the diameter of the bore in the pedestal 104. Likewise, the pushrod 202 of FIGS. 3A-B can be replaced with the push rod 102 of FIGS. 1A-B by similarly re-dimensioning the bushings 220 and the bore in the pedestal 204. One of ordinary skill in the art will recognize other components that can be interchanged between the various embodiments, and these changes are contemplated by the present invention.

Figure 4:
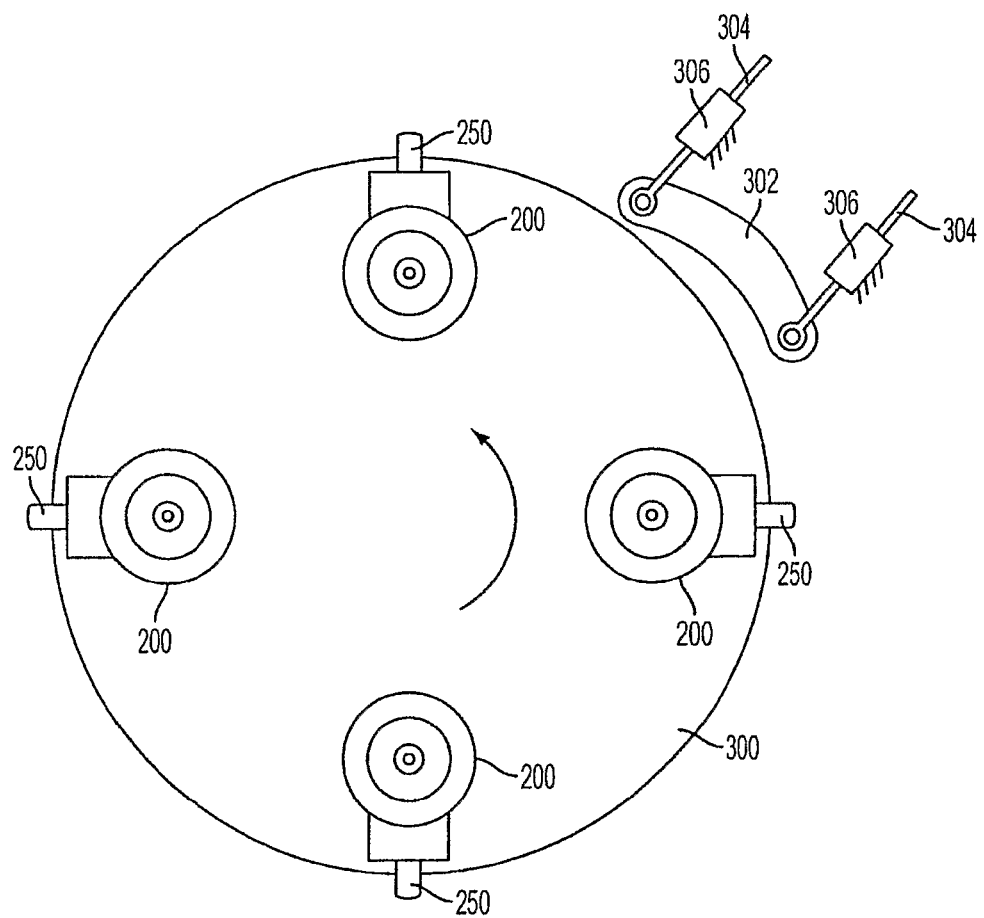
FIG. 4 depicts an exemplary blow wheel of a blow molding machine, including a plurality the base assemblies of FIGS. 3A-B.

Referring to FIG. 4, a plurality of base assemblies 200 can be located on blow wheel 300. When each respective base assembly 200 rotates past the stationary cam member 302, the first cam member 250 of the respective base assembly 200 contacts the stationary cam member 302, and moves from the position shown in FIG. 3A to the position shown in FIG. 3B. As a result, the first cam member 250 moves the push rod 202 from the initial position (FIG. 3A) to the extended position (FIG. 3B). Once the respective base assembly 200 moves a sufficient distance past the stationary cam member 302, the first cam member 250 returns to its initial position (FIG. 3A) under the force of the spring 266. Similarly, the push rod 202 returns to its initial position (FIG. 3A) under the force of spring 260.

The position of the stationary cam member 302 can be moved with respect to the blow wheel 300, as described above in connection with FIG. 2. This adjustment can be used, for example, to adjust the throw of the first cam member 250 and the corresponding stroke of the push rod 202. Additionally or alternatively, this adjustment may allow the stationary cam member 302 to be moved completely out of contact with the first cam members 250, for example, to eliminate wear on the components of the activation mechanism 230 and the stationary cam member 302 during dry cycling of the machine. The stroke of the push rod 202 can also be varied by changing the inclination of the cam surface 252 on the first cam member 250.

Although the activation mechanisms 130, 230 have been described above as being external to the push rod 102, 202, they may alternatively be located at least partially inside the push rod 102, as will be apparent to one of ordinary skill in the art.

Figure 5:
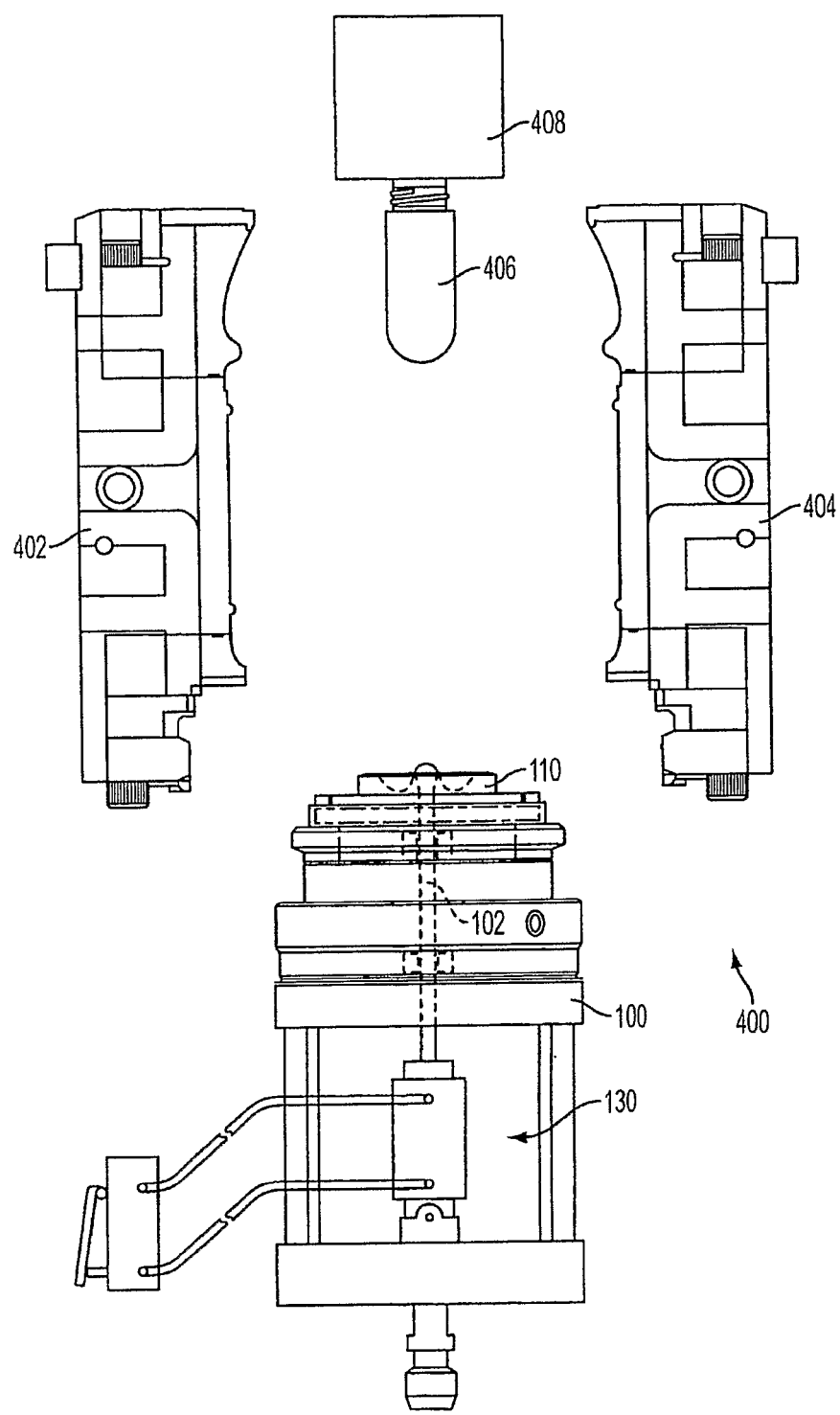
FIG. 5 depicts a blow mold according to an exemplary embodiment of the present invention.

Referring to FIG. 5, an exemplary blow mold according to the present invention is shown. The blow mold 400 comprises a plurality of mold portions that together define a cavity in which a plastic container is blow molded. The exemplary embodiment shown includes the following mold portions: a first side mold 402, a second side mold 404, and a base assembly 100. One of ordinary skill in the art will know and appreciate that base assembly 200 can alternatively be used in place of base assembly 100. One of ordinary skill in the art will further know and appreciate that other base assemblies within the scope of the present invention can also be substituted for base assembly 100. A parison 406 having a threaded finish is depicted as being attached to a holder 408. The first side mold 402 can contain a mold of one side of the container, and the second side mold 404 can contain a mold of the other side. The first and second side molds 402, 404 may be mirror images of one another, or they may have different shapes. Other combinations and different numbers of molds may be used, as will be understood by one of ordinary skill in the art.

Although the push rod 102 and activation mechanism 130 are shown in the exemplary embodiment of FIG. 5 as being associated with the base assembly 100, one of ordinary skill in the art will know and appreciate that a push rod and associated activation mechanism may be associated with any of the mold portions that comprise the blow mold 400. For example, a push rod and activation mechanism may be associated with the first side mold 402 or the second side mold 404, or both. In addition, one of ordinary skill in the art will know and appreciate that the blow mold 400 may include multiple push rods and activation mechanisms associated with one or multiple mold portions.

Figure 6A:
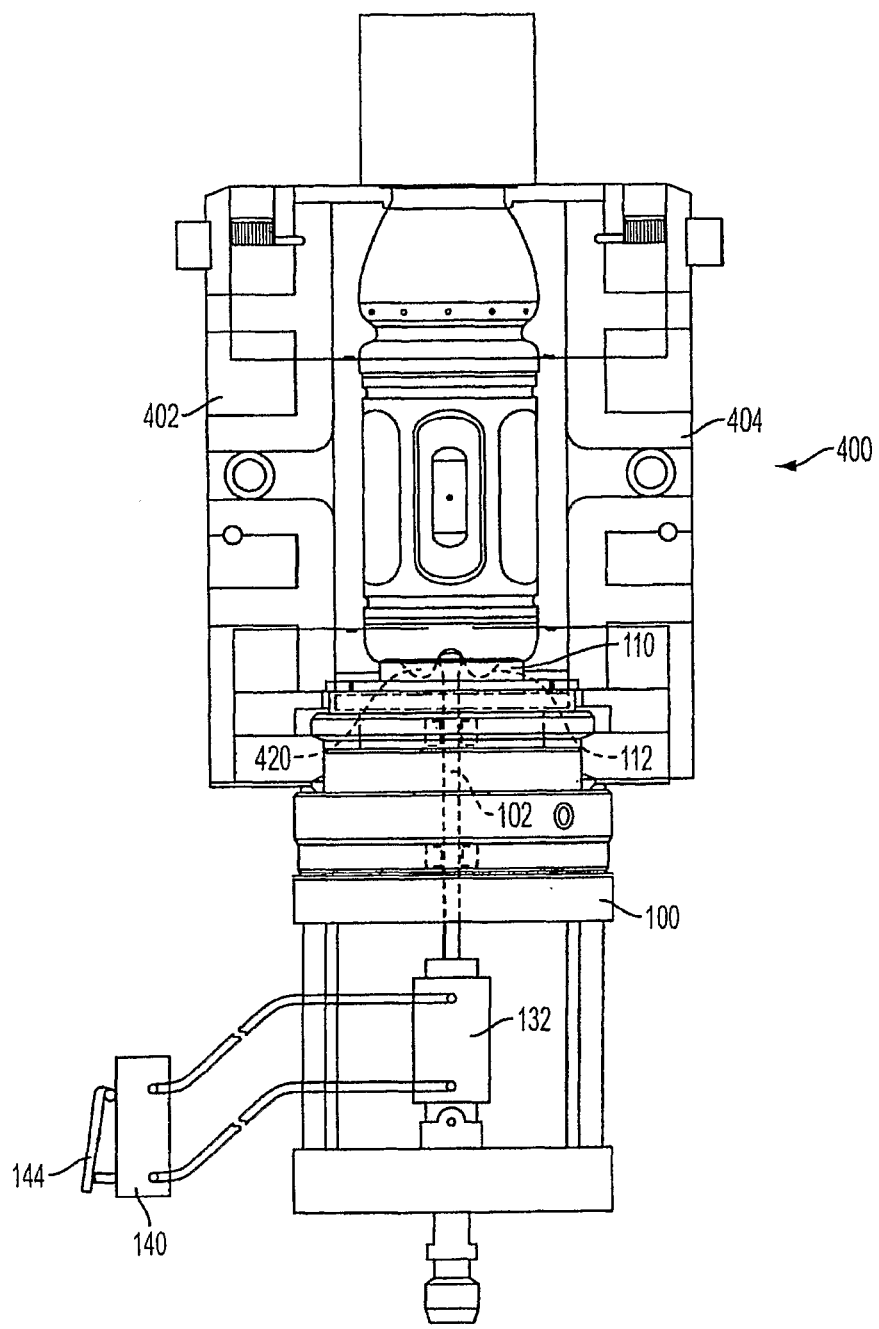
FIGS. 6A-B depict a method of blow molding a plastic container according to an exemplary embodiment of the present invention.
Figure 6B:
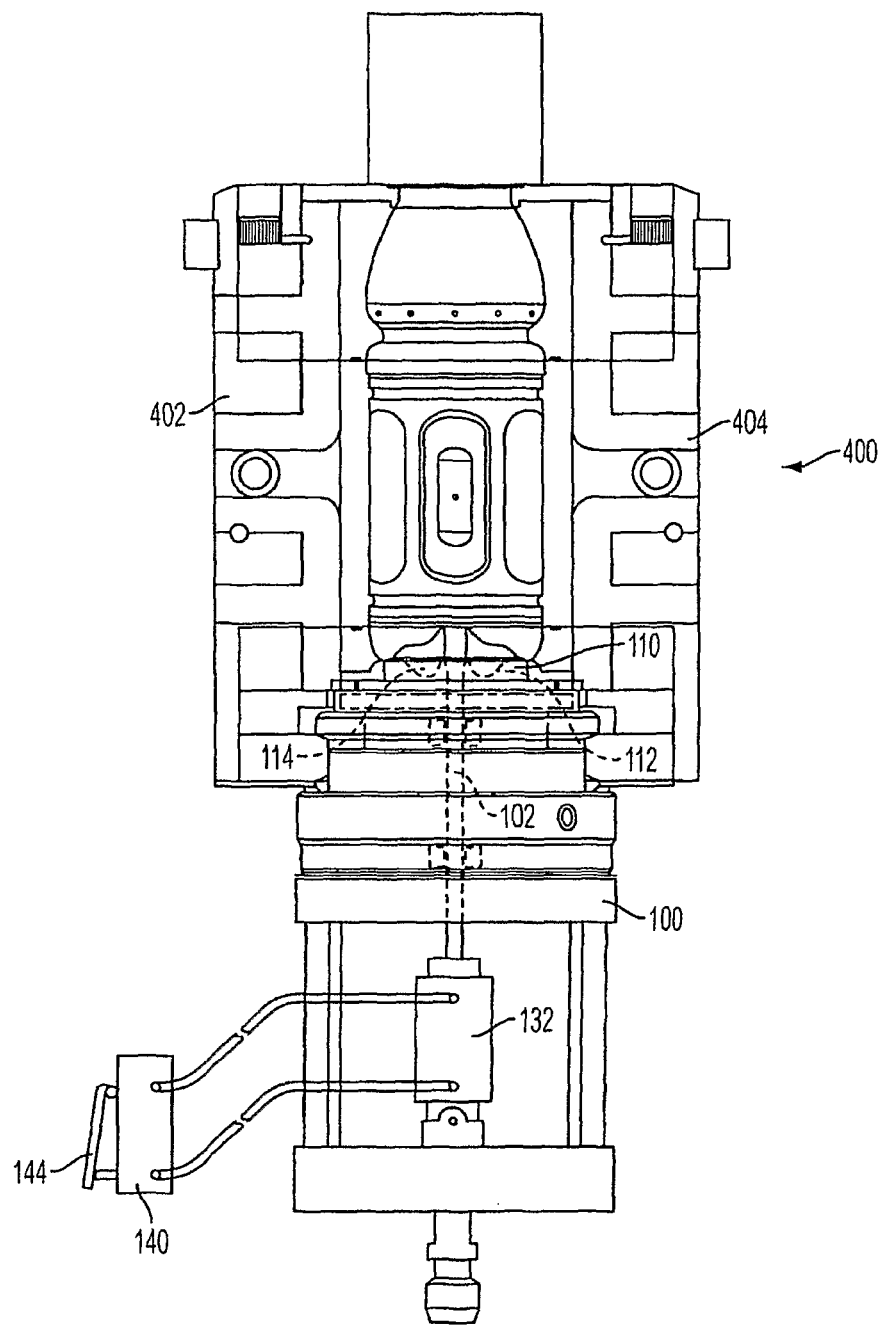

Referring to FIGS. 6A-B, the present invention also relates to a method of blow molding a plastic container. Prior to blow molding, a parison (for example, the parison 406 shown in FIG. 5) is enclosed in a mold cavity defined by the first side mold 402, the second side mold 404, and the base mold 110. Although base assembly 100 and base mold 110 are illustrated in FIGS. 6A-B, one of ordinary skill in the art will recognize that base assembly 200 and base mold 210 can alternatively be used, as can other base assemblies and/or base molds within the scope of the present invention. Once the parison is enclosed, gas can be forced into the parison to inflate the parison within the mold cavity. During inflation, the parison stretches into the form of the mold cavity to form a blow molded container. In the exemplary embodiment shown, as the parison material contacts the base mold 110, the parison material is blown against the contact surface 112 and into cavity 114 (see FIG. 6B), thereby forming a moveable region 420 in the base of the container. Further details and variations of the blow molding process will be apparent to one of ordinary skill in the art, and are further provided in co-pending U.S. Patent Application No. 60/671,459, the entire content of which is incorporated herein by reference.

After the container has been formed in the cavity, a movable portion of the blow mold can reposition the movable region of the container. For example, push rod 102 extending through the base mold 110 can move from its first or initial position, shown in FIG. 6A, to its second or extended position, shown in FIG. 6B, to reposition the movable region 420 in the base of the container. In the exemplary embodiment of FIGS. 6A-B, the moveable region 420 of the container base protrudes outward from the container and is downwardly convex prior to being repositioned. Movement of the push rod 102 upward toward the center of the container exerts pressure on the moveable region 420 of the base, and forces the movable region 420 into an inwardly protruding position. After the moveable region 420 is repositioned upward, the push rod 102 may be lowered. Thereafter, the side molds 402, 404, and the base mold 110 may be separated, thereby releasing the container from the blow mold 400.

Movement of the push rod 102 from the first position to the second position, and back again, can be realized using the air cylinder 132 and related elements described above in connection with FIGS. 1-2. According to this exemplary embodiment, the air cylinder 132 can be triggered electronically (e.g., via the blow molding machine's programmable logic controller), mechanically (e.g., via contacting switch 144 on pneumatic valve 140 with a stationary cam member 302, as illustrated in FIG. 2), or using other structures and techniques known to one of ordinary skill in the art. Alternatively, movement of the push rod can be realized using a first cam member 250, and a cam follower 256 associated with the push rod 202, as described in connection with FIGS. 3-4. The stationary cam member 302 can be used to trigger movement of the push rod 202, as shown in FIG. 4, however other configurations, manual, electronic, or other, are possible and contemplated by the present invention. People of ordinary skill in the art will know and appreciate that other structures and methods can be utilized to move the movable portion of the blow mold (e.g., the push rod) between the first and second positions.

According to one exemplary embodiment of the invention, repositioning of the base can occur prior to removing the container from the blow mold, so that the container may be placed on a substantially flat surface for transport to, for example, a filling machine, or alternatively, for transport during manufacturing or for palletizing, as is known in the art. The filling machine may fill the container by any known filling process, including hot filling, cold filling, and other filling processes known by those skilled in the art. By repositioning the moveable region 420, the container can stand stably on a substantially flat surface and be processed similar to containers with conventionally manufactured push-up bases. Further details of this aspect of the invention are provided in co-pending International Application No. PCT/US2004/024581, the entire content of which is incorporated herein by reference.

According to another exemplary embodiment of the invention, blow molding the base in the outwardly protruding position and subsequently repositioning it can result in a container having a deep protrusion or push-up without the occurrence of decreased crystallinity and/or or the presence of regions of thick, amorphous plastic, that are common in prior art forming methods. Further details of this aspect of the invention are provided in co-pending U.S. Patent Application No. 60/671,459, the entire content of which is incorporated herein by reference.

Although the figures of the present application illustrate the parison 304 as a preform having threads at the top, the parison may also be a threadless plastic tube without departing from the scope of the present invention. One example using a parison that is a plastic tube involves inserting a needle into the parison, and forcing gas through the needle to expand the plastic tube to take the shape of a mold. Additionally, any blow molding technique may be used for forming the container, including injection blow molding, stretch blow molding, or extrusion blow molding, as will be understood by those of ordinary skill in the art.

It is noted that the detailed description describes an exemplary method for blow molding a moveable region 420 on a container base. However, this technique may be used to form other regions of a container other than the base, such as to form at least a portion of a hand grip of a container, or to form other deep protrusions of a container. The cavity 420 may also be located on either side mold 402, 404, or on other locations in the base mold.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A method of stretch blow molding a plastic container, comprising:
    (a) enclosing a parison within a mold cavity of a blow mold within a stretch blow molding system, the blow mold comprising a side mold assembly and a separate base plug including a base mold defining a contact surface to form a shape of at least a part of a base portion of a plastic container, the contact surface including a cavity, an outer surface and an end surface of a push rod, the cavity being recessed relative to the end surface of the push rod, wherein the push rod extends through the base plug;
    (b) inflating the parison within the mold cavity to form a blow molded container having a movable region using the method of stretch blow molding; and
    (c) moving a portion of the blow mold to reposition the movable region while the blow mold container is in the mold cavity by moving the push rod from a first position to a second position so as to reposition the movable region from an outwardly protruding position toward an inwardly protruding position.

2. The method of claim 1, wherein step (c) further comprises activating an air cylinder to move the push rod from the first position to the second position.

3. The method of claim 1, wherein step (c) further comprises engaging a cam follower associated with the push rod with a cam member.

4. The method of claim 1, wherein the blow mold comprises a plurality of mold portions including the base mold and the side mold assembly.

5. The method of claim 1, wherein step (c) is triggered mechanically.

6. The method of claim 1, further comprising (d) releasing the blow molded container from the mold cavity.

7. A method of stretch blow molding a plastic container, comprising:
    (a) enclosing a parison within a mold cavity of a blow mold within a stretch blow molding system defining the mold cavity, the blow mold comprising a side mold assembly and a separate base plug including a base mold defining a contact surface to form a shape of at least a part of a base portion of a plastic container, the contact surface including a cavity, an outer surface and an end surface of a push rod, the cavity being recessed relative to the end surface of the push rod, wherein the push rod extends through the base plug;
    (b) inflating the parison within the mold cavity to form a blow molded container having a movable region using the method of stretch blow molding; and
    (c) moving a portion of the blow mold to reposition the movable region while the blow mold container is in the mold cavity by moving the push rod from a first position to a second position so as to reposition the movable region from an outwardly protruding position toward an inwardly protruding position.

8. The method of claim 1, wherein the side mold assembly comprises a first side mold and a second side mold.

* * * * *